United States Patent [19]

Hahn et al.

[11] Patent Number: 5,269,586
[45] Date of Patent: Dec. 14, 1993

[54] DEVICE FOR LOWERING THE FREE END OF A VEHICLE COVER

[75] Inventors: Christian Hahn, Hamburg; Edwin Lundgren, Bad Schwartau, both of Fed. Rep. of Germany

[73] Assignee: Design & Technik GmbH, Hamburg, Fed. Rep. of Germany

[21] Appl. No.: 808,893

[22] Filed: Dec. 18, 1991

[30] Foreign Application Priority Data

Dec. 22, 1990 [EP] European Pat. Off. ........ 90250338.2

[51] Int. Cl.⁵ .............................................. B60J 7/185
[52] U.S. Cl. ..................................... 296/224; 296/121; 292/240; 292/DIG. 5; 292/DIG. 43
[58] Field of Search .............. 296/121, 224; 292/26, 292/27, 30, 31, 65, 66, 240, DIG. 5, DIG. 14, DIG. 43

[56] References Cited

U.S. PATENT DOCUMENTS

| Re. 27,276 | 1/1972 | Erickson | 292/66 X |
|---|---|---|---|
| 2,703,431 | 3/1955 | Tatom | 292/26 X |
| 3,321,226 | 5/1967 | De Claire et al. | 292/65 |
| 3,325,200 | 6/1967 | Fowler | 292/66 X |
| 3,831,580 | 8/1974 | McLean | 292/64 X |
| 4,466,644 | 8/1984 | Wooten et al. | 296/224 X |
| 4,830,425 | 5/1989 | Muscat | 296/107 |

FOREIGN PATENT DOCUMENTS 0408951 1/1991 European Pat. Off. .
190762 11/1906 Fed. Rep. of Germany .
3923695 10/1990 Fed. Rep. of Germany .

*Primary Examiner*—Dennis H. Pedder
*Attorney, Agent, or Firm*—Nixon & Vanderhye

[57] ABSTRACT

A sunroof, or like vehicle cover, is secured to a motor vehicle frame utilizing a latching mechanism which has a simple construction, low overall height, and reliable operation. An engagement element on the vehicle cover cooperates with a hook mounted to the vehicle frame by a guide pin received within a guide slot, and a pivot pin received within a reception slot. One of the slots is linear and the other is non-linear. The slots, pins, and hook are positioned with respect to each other and the engagement element so that as the hook moves from an unlatched position to a latched position, moving the engagement element toward the frame, it moves through an intermediate position in which the engagement element is closer to the volume defined by the frame than in the latched position. A resilient, compressible material is preferably provided between the cover and frame to accommodate movement through the intermediate position, and to bias the components to the latched position.

19 Claims, 16 Drawing Sheets

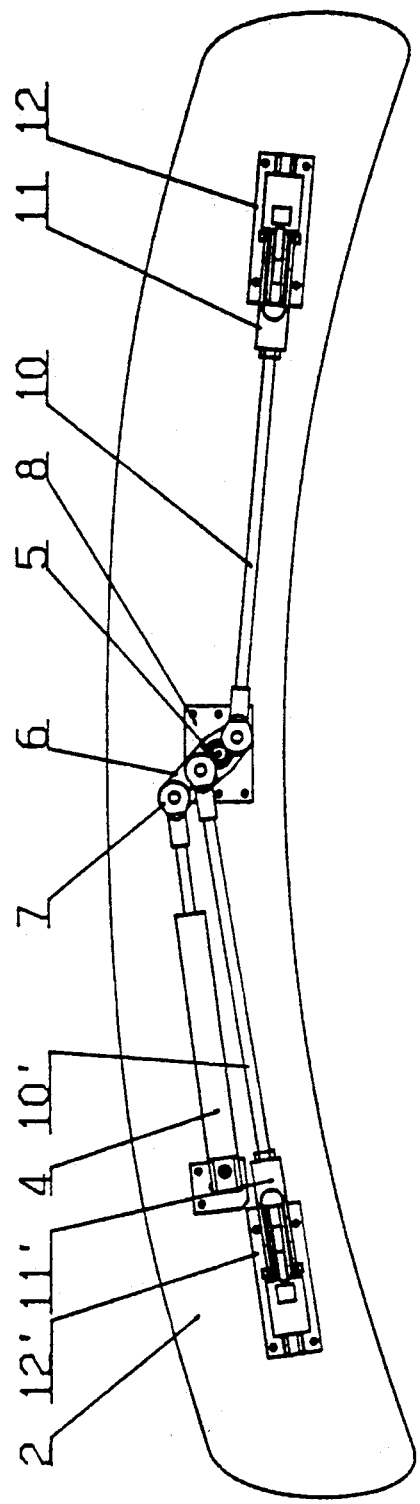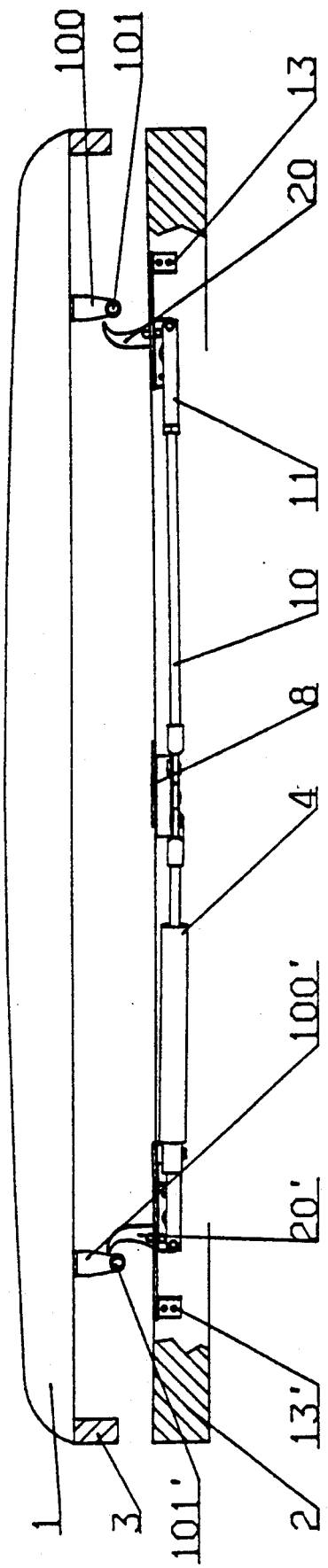

DEVICE FOR LOWERING THE FREE END OF A VEHICLE COVER

FIELD OF THE INVENTION

The present invention relates to a latching device for securing a sunroof, lid or cover to the frame of a vehicle.

BACKGROUND AND SUMMARY OF THE INVENTION

The invention relates to a device for lowering the free end of a vehicle cover, hood, sunroof or the like onto the frame of a vehicle from an open engaged position in which the vehicle cover or the like is disposed above the vehicle frame and for holding the front end of the vehicle cover or the like in the lowered or closed position. The vehicle cover or sunroof includes at least one engagement element provided at the free end of the vehicle cover for engaging a lowering hook provided on the frame. The lowering hook has an actuating contour for sliding engagement with the engagement element and is pivotally coupled to the actuating rod of a drive arrangement by way of a pivot pin engaging an elongated reception slot. The lowering hook is movable by the drive arrangement between a raised engagement position and a lowered locking position.

One example of a known latching device is shown in German Patent No. 39 23 695. The lowering hook has a recessed engagement region on its side facing the actuating rod. When in the locking position, a pivotable locking pawl is in locking engagement with this recessed region of the lowering hook thereby retaining the lowering hook in the locking position. In order to disengage the locking pawl from the lowering hook and to permit the vehicle cover, hood or the like to be opened, the actuating rod may be moved by the drive arrangement in such a way that initially, the pivot pin is displaced towards an elongated reception slot formed in the locking pawl, without the position of the lowering hook being changed. Upon this displacement movement of the pivot pin into the reception slot, an auxiliary element is provided on the actuating rod and engages the locking pawl and pivots it out of engagement with the lowering hook. The lowering hook is then subsequently pivoted by the pivot pin into the raised engagement position by the continuing movement of the actuating rod.

Likewise, to move the lowering hook from its raised engagement position to the lowered locking position, the pivot pin is engaged by that end of the reception slot which is closest to the engagement element by the corresponding movement of the actuating rod. The lowering hook is then pivoted, wherein the auxiliary element provided on the actuating rod approaches the locking pawl and moves the locking pawl along until it reaches the locking position and then urges the locking pawl into engagement with the lowering hook.

In view of the previous example, it is possible to combine a relatively low overall height with reliable lowering and locking of the vehicle cover, hood, sunroof or the like to the frame of the vehicle. However, the prior art has to be constructed with relatively high precision in order that the lowering hook, locking pawl, pivot pin and the elements provided on the actuating rod for moving the locking pawl, will cooperate in the desired manner.

According to the invention, a device for lowering the free end of a vehicle cover or the like which combines a simple construction with a low overall height and reliable operation, is provided.

According to the present invention, a device of the type mentioned previously is designed in such a way that the reception slot for the pivot pin is formed on the locking part. A lowering hook has an elongated guide slot engaged by a guide pin which is secured to the locking part and about which the lowering hook is pivotable. The lowering hook while being moved into the locking position by the displacement of the guide pin along the guide slot, but before reaching it, passes through an intermediate position in which the engagement element has been lowered to a position which is greater than that which will be realized when the engagement element is in the locking position, so that the lowering hook is automatically retained in the locking position.

In accordance with the present invention, and in contrast to the design of the previously described prior art, neither a locking pawl, nor any other type of locking element which normally would have to move in exact coordination with the movement of the lowering hook, is necessary. The lowering hook is self-locked in the locking position by the cooperation of the shape of the reception slot, the shape of the guide slot and the design of the actuating contour of the lowering hook.

In a preferred embodiment of the present invention, the surface of the reception slot which supports the pivot pin in the locking position may travel through a tortuous path by first ascending from a first end region which receives the pivot pin in the locking position to an intermediate position which is below the height of a second end region. Thus, upon movement of the lowering hook towards the locking position, the pivot pin is first moved along the ascending part of the supporting surface of the reception slot towards the region of the intermediate position thereby urging the lowering hook downwardly, which is now in engagement with the engagement element, so that the engagement element and thus the vehicle cover, hood, sunroof or the like is pulled towards the frame. During this downward movement of the lowering hook, the lowering hook passes through a position which corresponds to the level of the locking position and due to the further ascent of the surface of the reception slot, it is lowered still further into the region initially encountered while the pivot pin travels through the intermediate position, so that the vehicle cover is lowered beyond the locking position of the lowering hook towards the frame. This movement is accompanied by the compression of a seal or other resilient means disposed around the vehicle frame.

It is only when the region of the supporting surface of the reception slot producing the intermediate position has been passed that the pivot pin enters a second end region of the reception slot which establishes the locking position. Once in the second end region the lowering hook rises again slightly and the previously heavily compressed seal or other resilient means is slightly relieved of stress. The lowering hook may be moved from this position only by displacement of the pivot pin across that portion of the supporting surface of the reception slot which forms the intermediate position, for which purpose a force is required which effects the aforementioned additional lowering movement of the engagement element. By traveling a distance beyond that required by the locking position, the lowering hook is automatically retained in the locking position and may be released from this locking position only by applying a corresponding force to the actuating rod and cannot be inadvertently released by the normal forces associated with vehicle movement.

The first end portion contiguous to the ascending portion of the surface of the reception slot extends preferably horizontally, so that the lowering hook may be pivoted in a very simple manner out of the locking position and across the engagement position into a substantially perpendicular position.

The pivot pin is reliably guided in the reception slot as the reception slot has a substantially constant width over its entire length.

In a reception slot of this kind, constructed to effect a self-locking action, the guide slot, which is provided in the lowering hook and is engaged by the guide pin secured to the frame, may be of linear configuration.

In another embodiment of the invention, that surface of the guide slot which supports the guide pin in the locking position extends longitudinally from a first end region which receives the guide pin in the locking position, to a second end region so that the guide pin may travel through the intermediate position of the reception slot.

Thus in this embodiment, the movement displacing the lowering hook from the engagement position into the locking position which passes through an intermediate position lying lower than the locking position, is achieved by virtue of the shape of the guide slot. The lowering hook, when in its locking position, is in a self-locking state, as the guide pin may be moved downwardly out of this locking position only by applying a force to the actuating rod in order that the lowering hook will be lowered beyond its locking position.

In this construction, a preferably substantially linear first end portion is contiguous to the descending intermediate portion of the surface of the reception slot.

The reception slot preferably has a substantially constant width over its entire length for the reliable and uniform guidance of the guide pin.

If the guide slot is configured in accordance with the second embodiment, the reception slot may alternatively be constructed so as to extend horizontally.

BRIEF DESCRIPTION OF THE DRAWINGS

FIG. 3 is a view like that of FIG. 1, only showing the arrangement before the lowering hook of the device in accordance with the invention engages the engagement elements of the vehicle cover to be lowered;

FIG. 4 is a view like that of FIG. 2, only showing the components in the relative positions corresponding to FIG. 3;

DETAILED DESCRIPTION OF THE DRAWINGS

The invention is described hereinafter in connection with the term "vehicle cover"; it is to be understood that said term covers sunroofs, hoods, trunks, and other covering components associated with vehicles.

Figure 1:
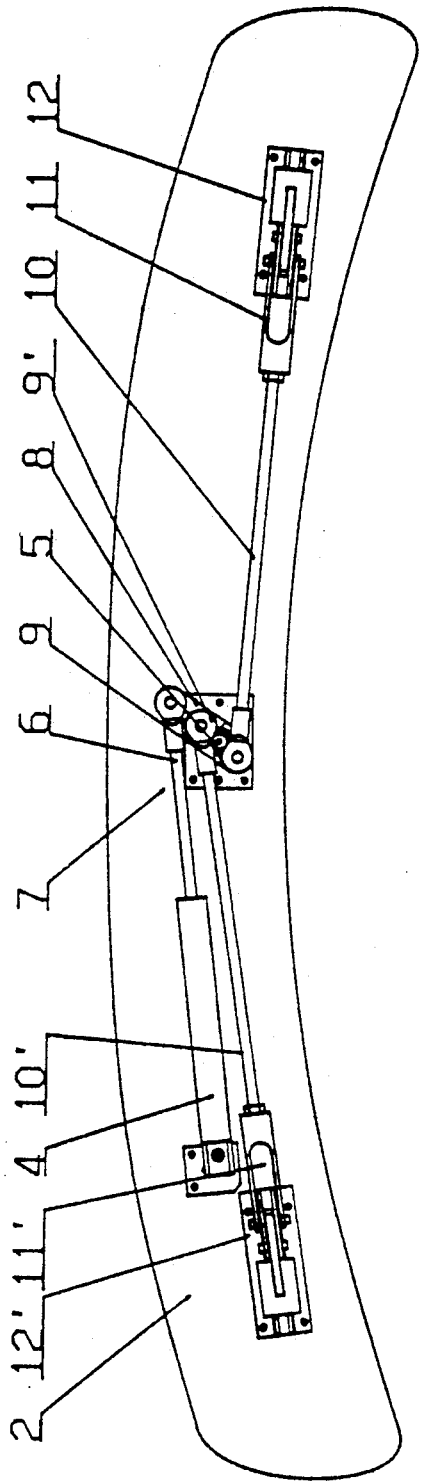
FIG. 1 is a diagrammatic partial view, partially in cross-section and partially in elevation, of the front end of a vehicle cover lowered by means of an exemplary device according to the invention, which end rests on the apron forming part of the vehicle frame.

FIGS. 1 to 4 show, diagrammatically, the apron 2 which is located above the windshield of a motor vehicle and which forms part of the vehicle frame 2'. The apron/frame 2, 2' define an opening 30 and an interior volume 31 (i.e. the inside of the vehicle frame) FIGS. 1 and 3 show, above this apron, the front end of a vehicle cover 1 which may be moved, in a manner not shown, either manually or by means of a drive, out of the position shown in FIG. 1, a fully retracted position, and from this position into the position shown in FIG. 3. A resilient, compressible, material seal 3, e.g. made of rubber, synthetic rubber, dense plastic foam, or the like, is provided on the frame-shaped edge of the vehicle cover 1, and rests on the lateral edge region of the apron 2 when the vehicle cover 1 is in its locked position (as shown in FIG. 1). The resilient material seal 3 is preferably disposed around the entire periphery of the cover 1.

The cover 1 illustrated is in the shape of a sunroof. It will have a different shape if functioning as a hood, trunk, or the like.

The device for lowering and securing the front end of the vehicle cover 1 includes a hydraulic working cylinder 4 serving as a drive and secured to the underside of the apron 2. A piston rod to which cylinder 4 is slidably connected is attached at its free end by a pin 7 mounted on a swivel head 6. This swivel head is secured to a base plate 8, which is attached to the underside of the apron 2, so as to be pivotable about a central axis 5. Base plate 8 is connected to apron 2 by pins 9 which lie parallel to the pin 7 and are provided on both sides of the base plate 8. The pins 9 engage the exposed ends of actuating rods 10, 11 and 10', 11', each of which serves to actuate a lowering hook 20, 20', which, as may be seen particularly in FIGS. 1 and 3, engage, or may be brought into engagement with, engagement elements 101, 101'. The engagement elements 101, 101' are each secured to the underside of the vehicle cover 1 by means of retaining portions 100, 100'.

Figure 2:
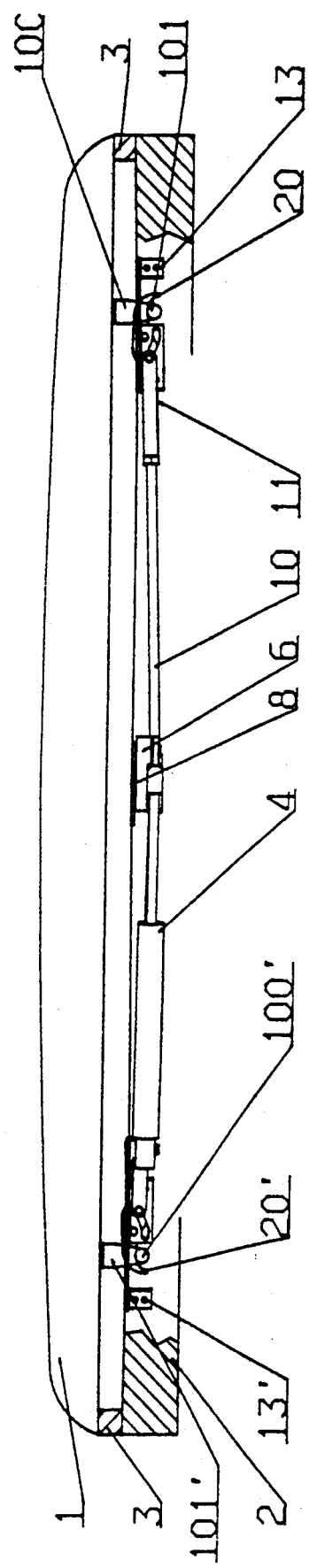
FIG. 2 is a simplified inverted plan view of FIG. 1.

As will be seen by comparing FIGS. 1 and 2 with FIGS. 3 and 4, the lowering hooks 20, 20' may be moved out of the position shown in FIG. 3, in which they are directed substantially upwardly and are disengaged from the engagement elements 101, 101' on the vehicle cover 1, into the locking position shown in FIG. 1 by actuation of the cylinder 4, in that the piston rod of the cylinder 4 is moved hydraulically out of the cylinder from its retracted position shown in FIG. 4 and into the position shown in FIG. 2. The swivel head 6 is thereby pivoted about the central axis 5, whereby the actuating rods 10, 11 and 10', 11' are moved in such a way that their outer free ends move closer to the center of the apron 2, that is, into the position shown in FIG. 2 in which the lowering hooks 20, 20' have been lowered into the locking position.

It will be appreciated that the actuating rods 10, 11 and 10', 11' may also be displaced by means of other drives, such as separate working cylinders, as is shown in German Patent No. 39 23 695, or even manually, such as by means of an arrangement in accordance with European Patent Application No. 0 408 951, the disclosures of which are hereby incorporated by reference herein.

Since the illustrated device for lowering and securing the front end of the vehicle cover 1 has two similar arrangements of identical construction, each actuated by an actuating rod 10, 11 and 10', 11' The individual elements in the two arrangements have been identified by identical reference numerals, although they have been identified with an additional "'" in the arrangement shown on the left in FIGS. 1 to 4. Owing to this similarity in the design, only the arrangement on the right in FIGS. 1 to 4 will be described hereinafter.

Figure 5:
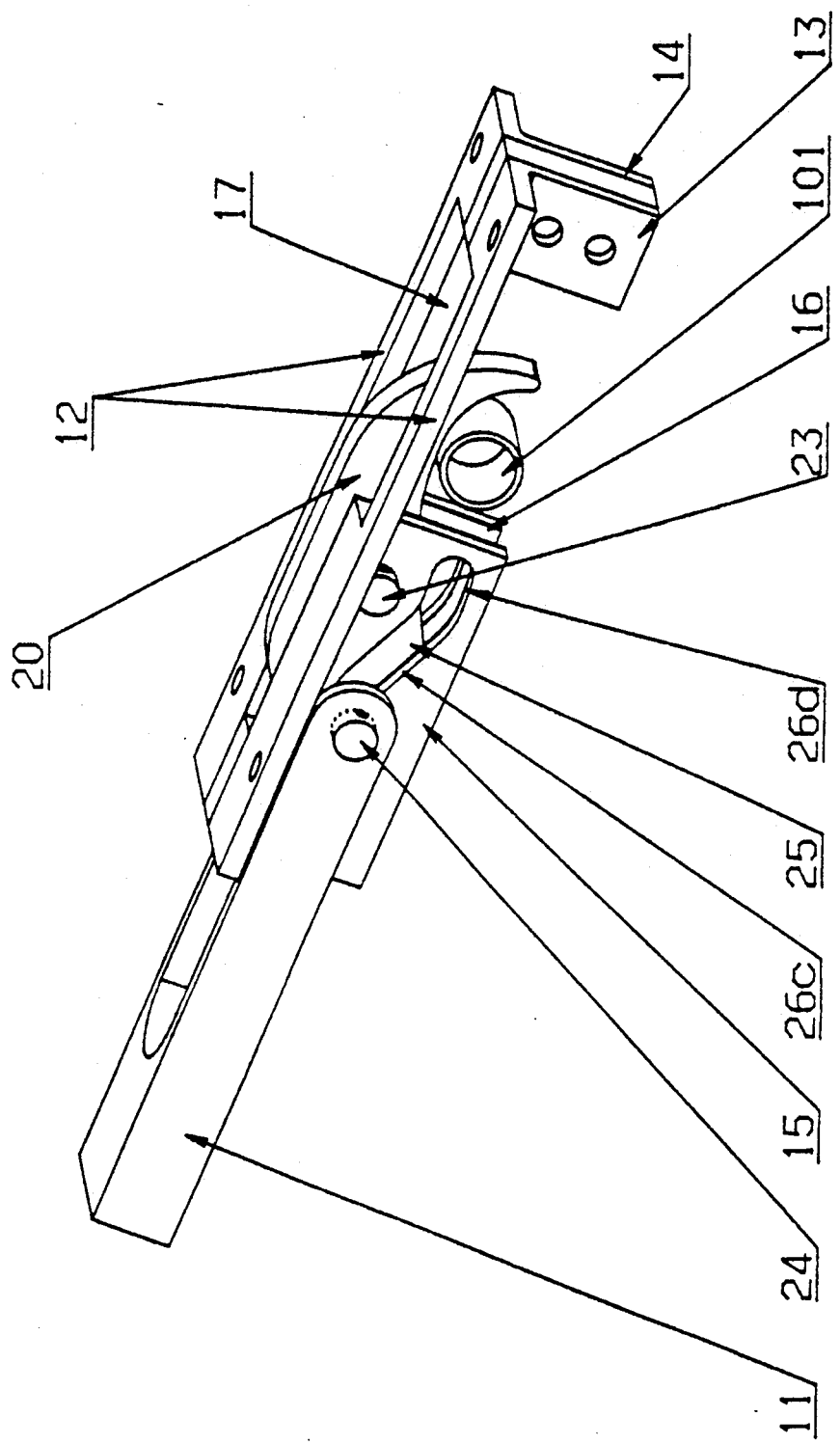
FIG. 5 is a perspective, partial representation of a locking part with lowering hook in the locking position and engaged by the end of an actuating used in the device of FIGS. 1 to 4.

As is shown particularly in FIG. 5, a locking part 12 is provided for retaining the lowering hook 20 and comprises two component elements, its upper surface being secured by means of screws to abut against the apron 2/frame 2', so that locking part 12 becomes part of the apron 2/frame 2'. Angled portions 13, 14, 15 extend downwards from these portions of the locking part 12 which are secured to the apron, spacers (not shown) being secured between the angled portions by fasteners, e.g. screws. The two elements of the locking part 12 form an opening 17 therebetween, the lowering hook 20 being disposed in the opening. The lowering hook 20 has an elongated guide slot 22 (FIG. 6) through which a guide pin 23 extends, the guide pin being secured to the locking part 12 and thus to the frame. Furthermore, a pivot pin 24 is pivotally held in the lowering hook 20 and extends parallel to, and below, the guide pin 23 and at both ends into reception slots 25 which are formed in the portions 15 of the locking part 12 and the function of which will be explained subsequently with reference to one of the reception slots. The pivot pin 24 is secured in the walls of the bifurcated portion 11 of the actuating rod 10, 11. This bifurcated portion 11 is connected, in a manner not shown in detail, to the portion 10 of the actuating rod by a fastener.

The lowering hook 20 has a partially curved actuating contour 21 which is brought into engagement with the engagement element 101 for the purpose of lowering the vehicle cover 2. This engagement element may comprise a tubular part, although, in order to reduce friction, it is also possible to provide a pin having a bush rotatably disposed thereon. In this connection, it will be appreciated that as a result of the overall design of the vehicle cover, the engagement element 101 may be moved only in a perpendicular line, that is, along the line 102, while lateral displacements relative to line 102 are not possible.

For the purpose of describing the mode of operation of the device shown in FIGS. 1 to 5, reference is made to FIGS. 6 to 12 which illustrate the course of the movement upon lowering the vehicle cover 1.

Figure 6:
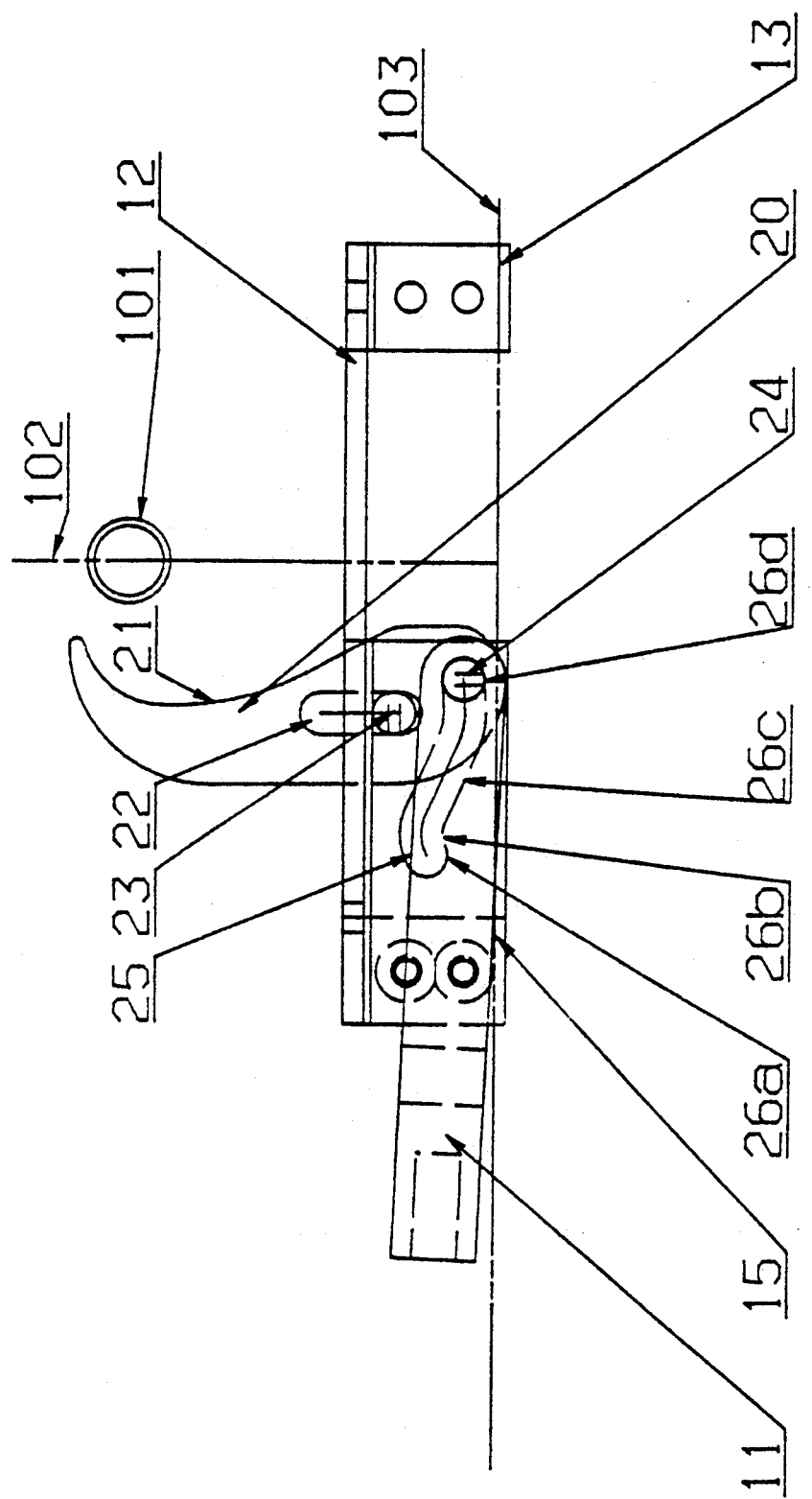
FIGS. 6 to 12 are side, diagrammatic views of various positions of the lowering hook and of the engagement element of the vehicle cover of the device of FIGS. 1 to 5.

When in the starting position, the vehicle cover 1 is disposed above the vehicle frame, so that the engagement element 101 lies at the indicated distance above the reference line 103 as shown in FIG. 6. The lowering hook 20 is located in a substantially perpendicular, upwardly directed engagement position (FIG. 6). It is brought into this position by displacement of the actuating rods 10 and 11 to the right as viewed in FIGS. 6 to 12. In this position, the pivot pin 24 is located at the outer end, that is, the right-hand end of the reception slot 25 (FIG. 6) and the guide pin 23 is located at, or close to, the lower end (FIG. 6) of the guide slot 22 which is formed in the lowering hook 20, and whose width is sized and configured to accommodate the diameter of the guide pin 23.

The reception slot 25, whose width is chosen in such a way that the pivot pin 24 is retained so as to be guided substantially by the two lateral walls of the reception slot, that is, the shape of the lower edge of the reception slot 25 corresponds to that of its upper edge, is curved approximately in the shape of a sinusoidal construction, or flattened S. Thus, the portion 26d, on the right in FIG. 6, of the lower surface of the reception slot 25 extends approximately horizontally. A portion 26c ascending approximately linearly is contiguous to the left of the portion 26d and terminates at an intermediate portion 26b forming the highest point of the slope of the surface. An end portion 26a directed somewhat downwardly then extends to the left from the intermediate portion 26b.

Figure 7:
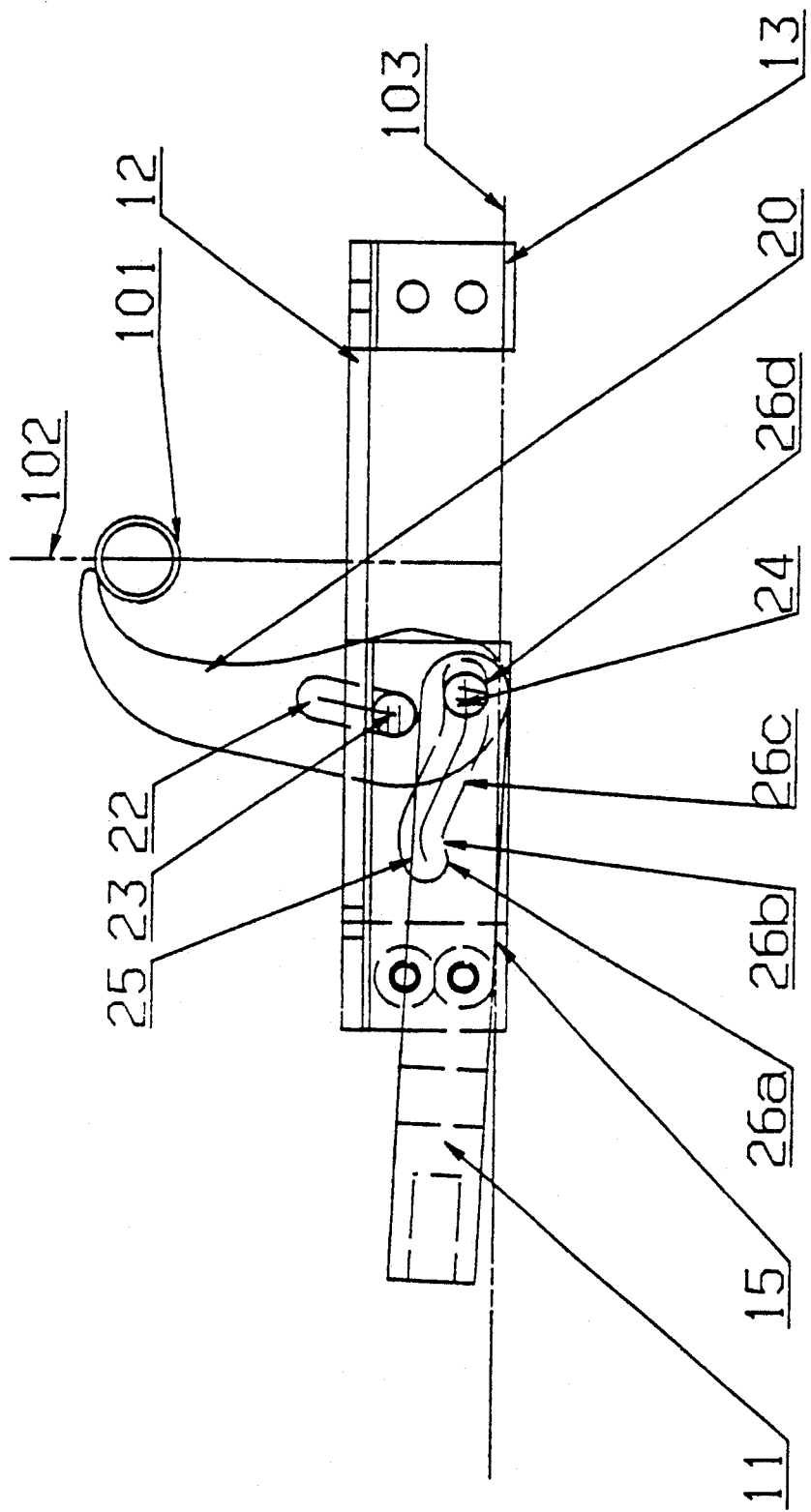
Figure 8:
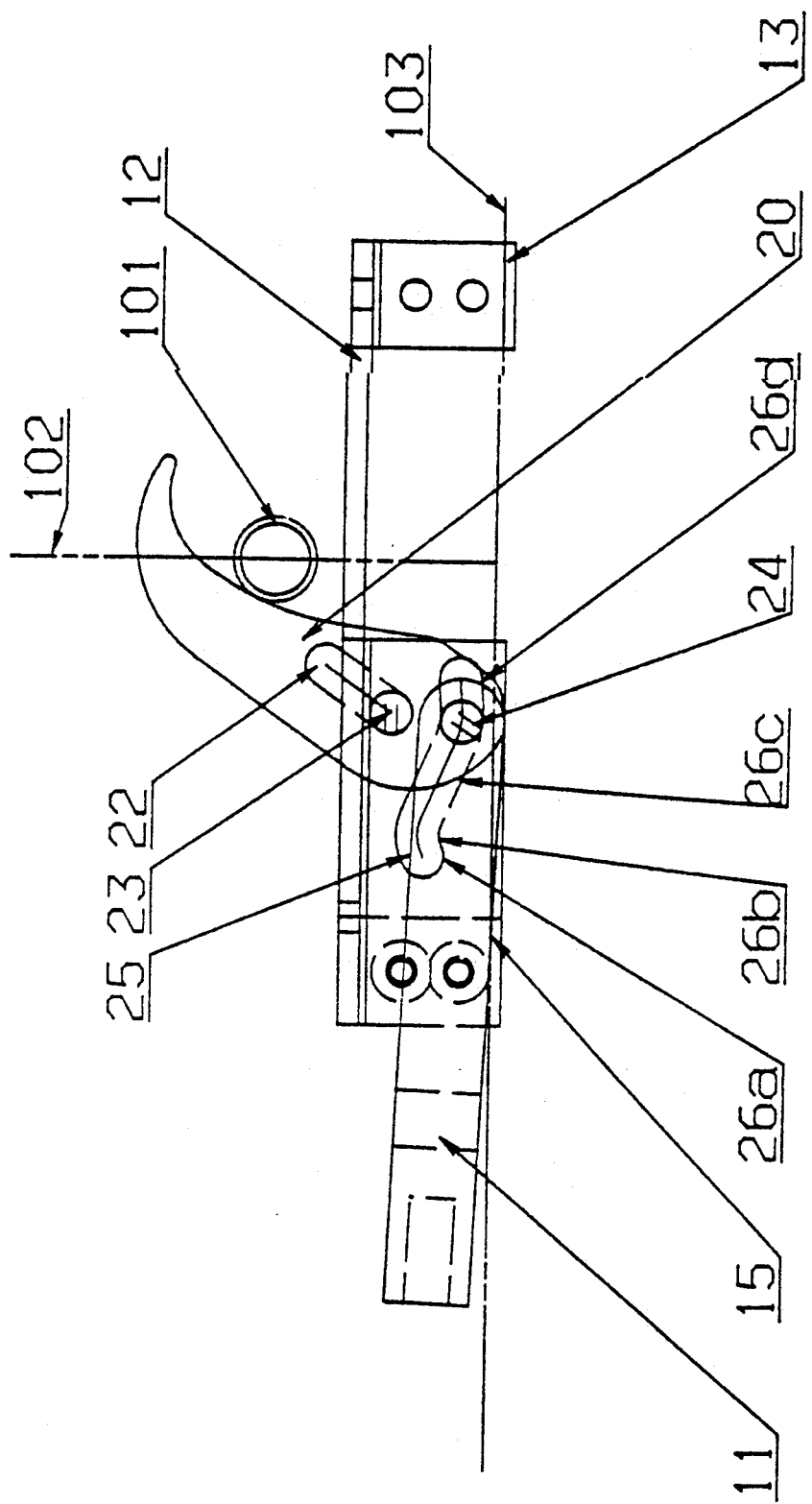
Figure 9:
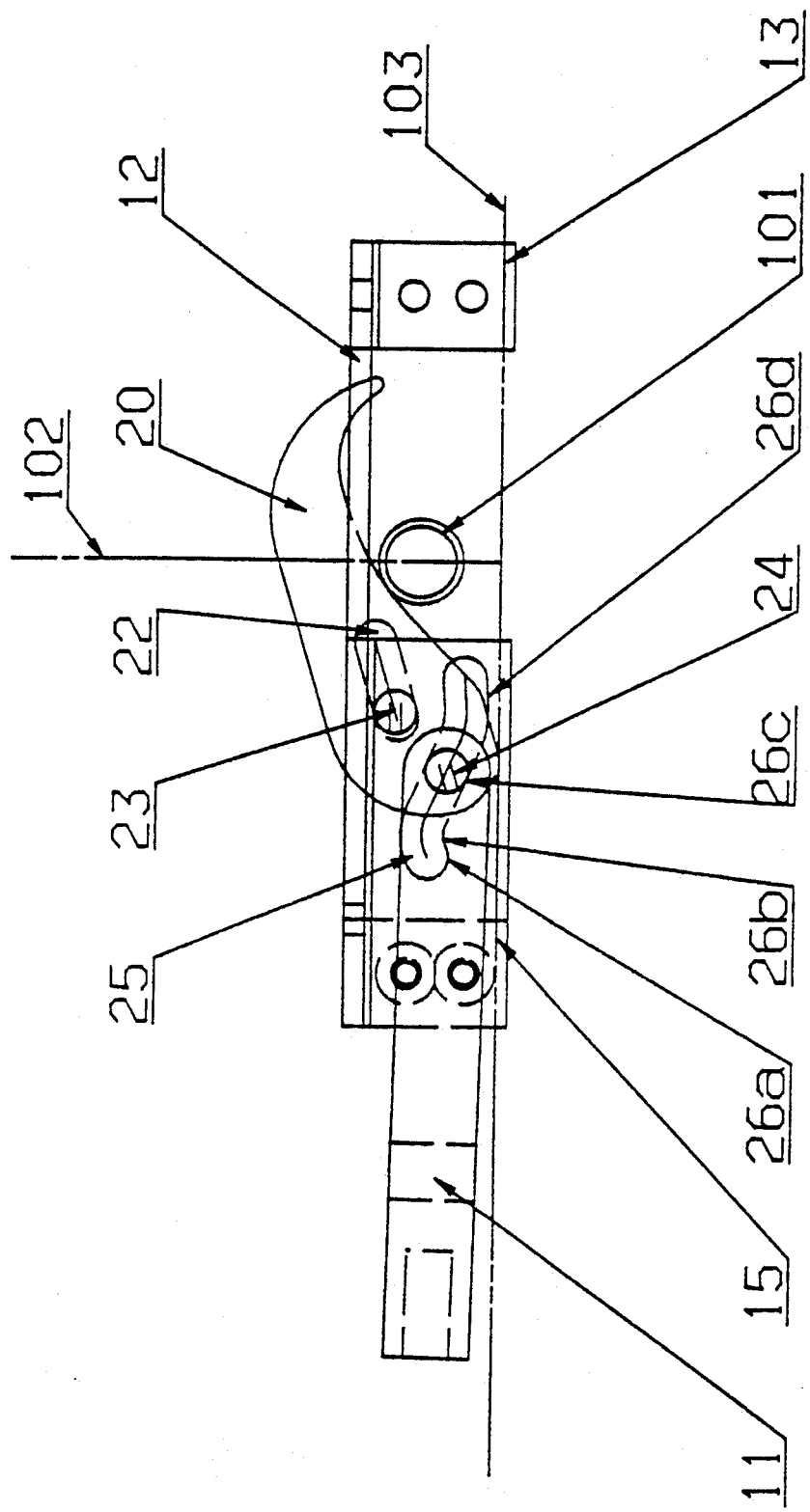
Figure 10:
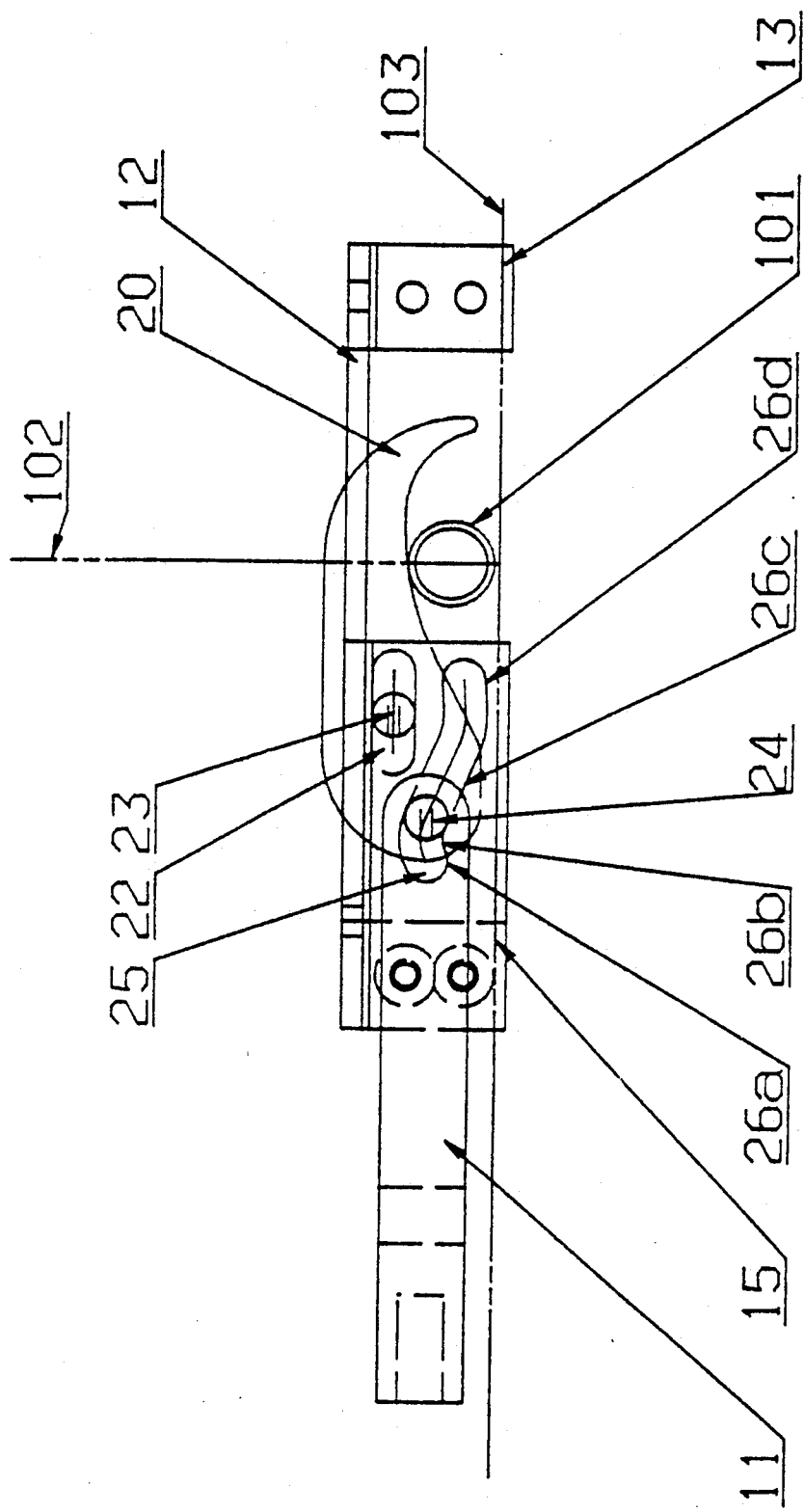

Referring now to FIGS. 7 through 9, the actuating rods 10 and 11 are displaced to the left for the purpose of lowering the vehicle cover 1, the pivot pin 24 in the reception slot 25 is thereby moved to the left and the lowering hook 20 performs a pivoting movement which takes place about the guide pin 23 and is accompanied by displacement of the guide pin 23 relative to the longitudinal extent of the guide slot 22. Thus, firstly the pivot pin 24 moves along the horizontal portion 26d in the reception slot 25, and the lowering hook 20 is brought into engagement with the engagement element 101 of the vehicle cover 1 (FIG. 7). The further movement of the actuating rods 10 and 11 allows the pivot pin 24 to move along the linearly ascending portion 26c of the reception slot 25 and causes the engagement element 101 to be lowered along the line 102 as a result of the pivoting movement of the lowering hook 20 in engagement with the engagement element 101 (FIGS. 8 and 9). As will be seen, the engagement element 101 moves closer and closer to the reference line 103 during this lowering movement.

The tortuous path of the reception slot 25 commences approximately with the ascending movement of the pivot pin 24 along the portion 26c of the reception slot 25, the guide pin 23 is also displaced along the guide slot 22 towards the right-hand end of the guide slot 22 as viewed in FIG. 9. Shortly before the pivot pin 24 has reached the intermediate portion 26b forming the highest point of the lower surface of the reception slot 25, the engagement element 101 has been lowered into a position (FIG. 10) which corresponds to that of the locking position. Movement of the pivot pin 24 onto the intermediate region 26b of the reception slot 25 moves the engagement element 101 from this position still further downwards along the line 102 into a position (FIG. 11) in which the pivot pin 24 is located on the intermediate region 26b. This additional lowering, which becomes clear by comparing the distance of the engagement element 101 from the reference line 103 in FIGS. 10 and 11, causes additional compression of the resilient seal 3 (FIGS. 1 and 3) which comes into engagement with the edge of the apron 2.

Figure 11:
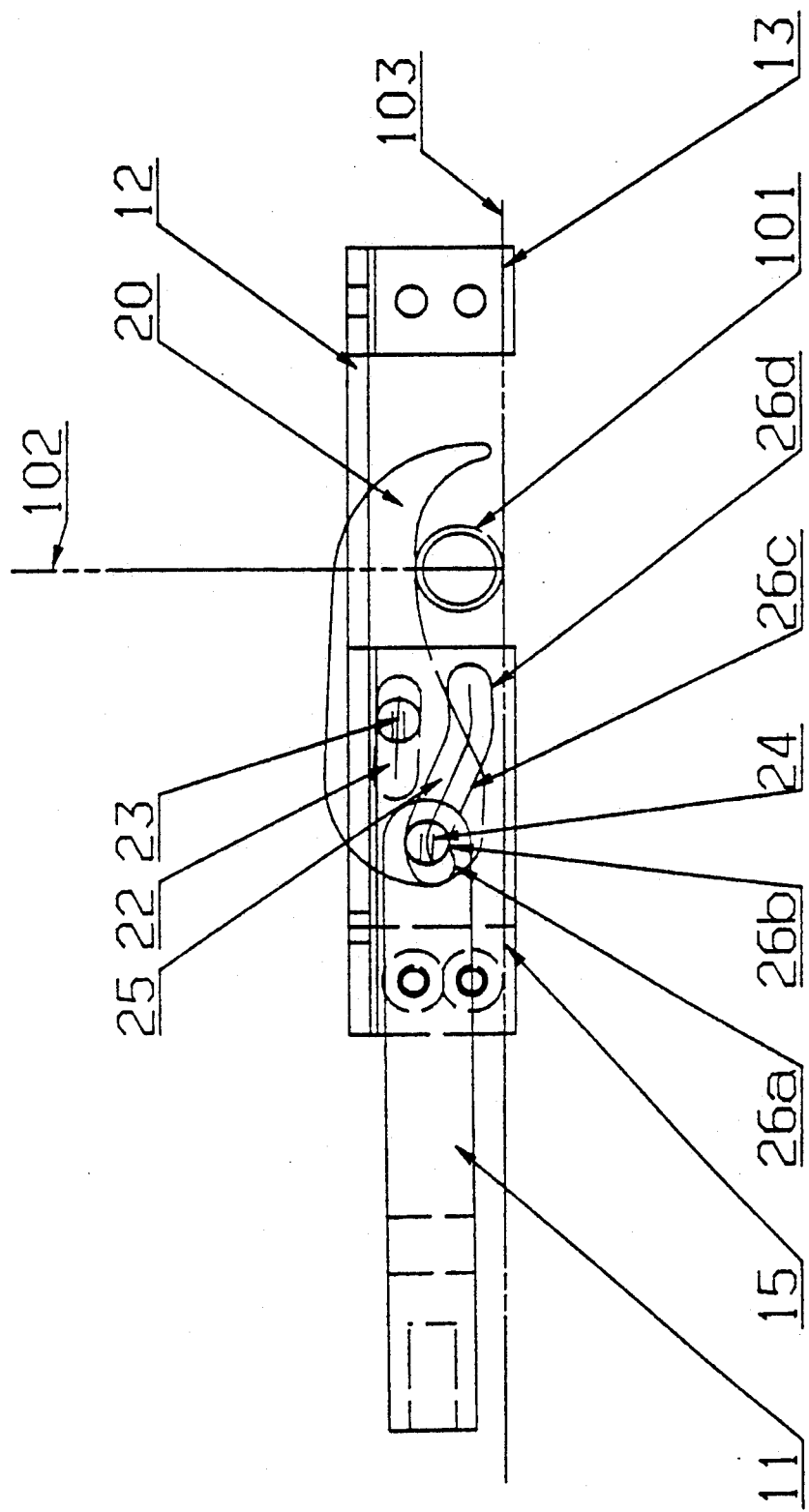

The further movement of the actuating rods 10 and 11 to the left, from the position illustrated in FIG. 11, then displaces the pivot pin 24 beyond the intermediate region 26b of the reception slot 25 into the somewhat lower end region 26a, and, as a result of the lowering movement of the pivot pin 24, the lowering hook 20 rises again slightly. Once in the locking position (FIG. 12) the engagement element 101 of the vehicle cover 1 is located somewhat above the reference line 103 and thus again approximately in the position shown in FIG. 10. In this position, the guide pin 23 has also reached the right-hand end of the guide slot 22. The lowering movement has been completed.

Figure 12:
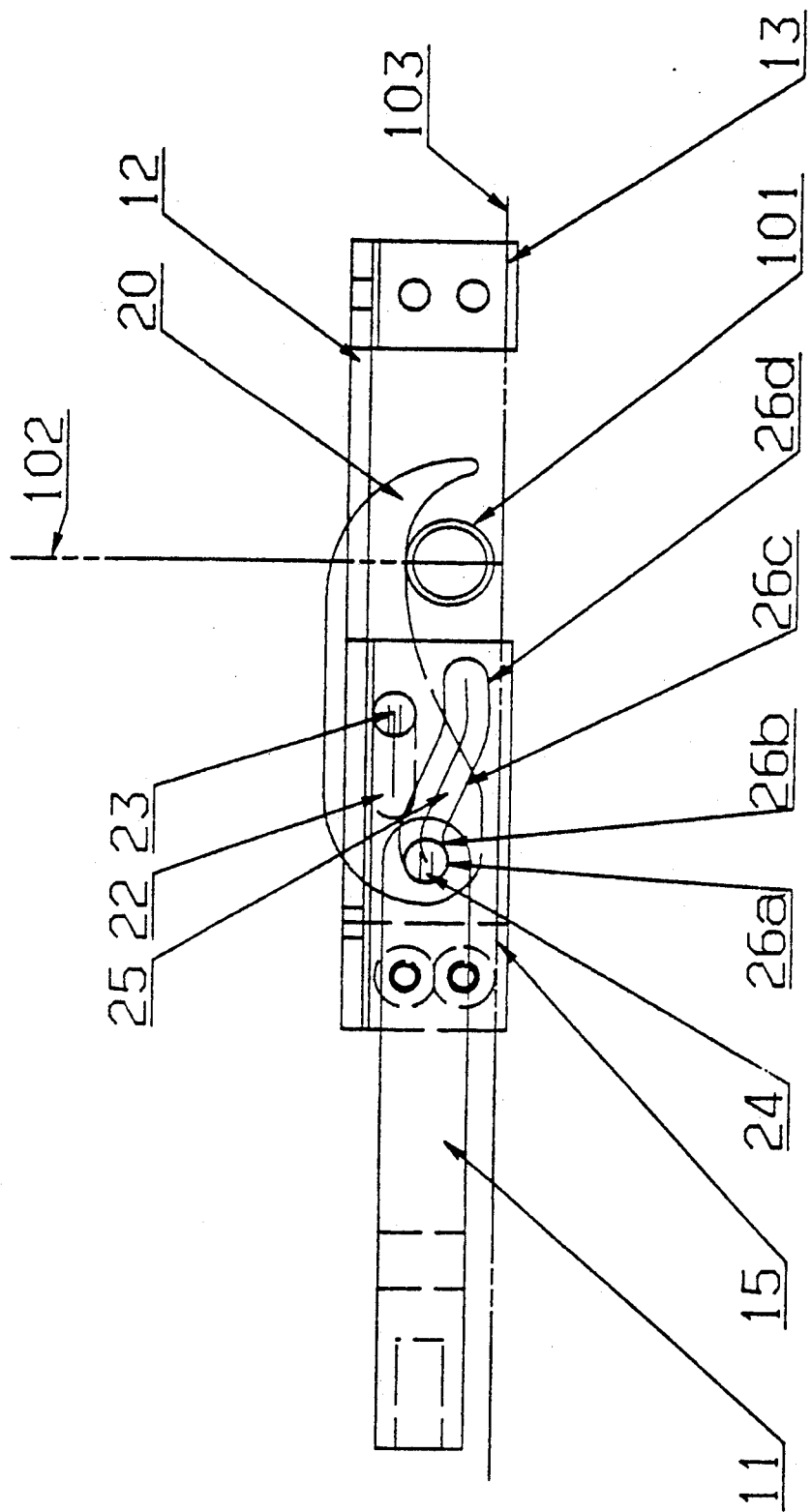
Figure 13:
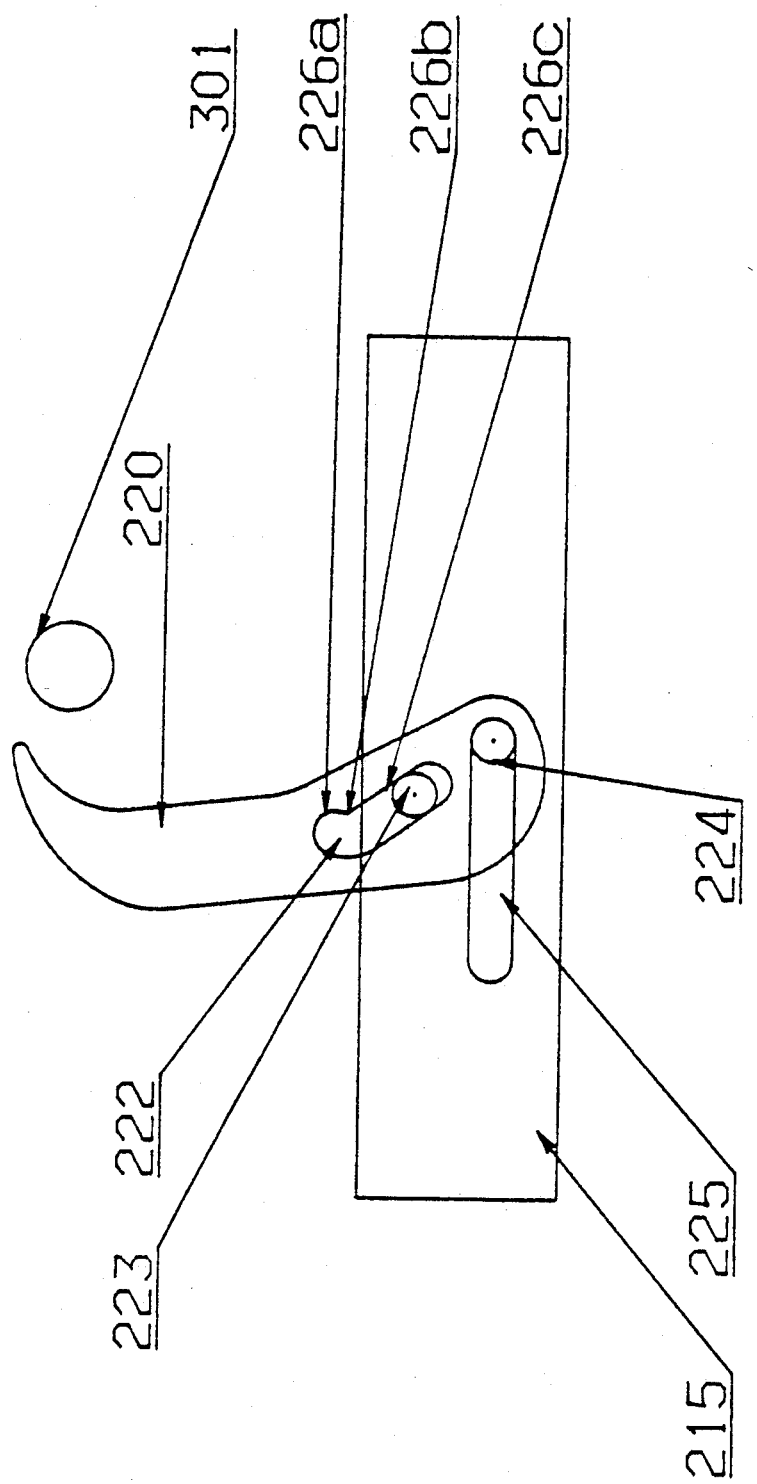
FIGS. 13 to 18 are representations, corresponding to FIGS. 6 to 12, of a second exemplary embodiment of a lowering device according to the invention.

When in the locking position shown in FIG. 12, the pivot pin 24 is located, as described, in the end portion 26a which is lower than the intermediate portion 26b of the reception slot 25, while the forces produced by resilient deformation of seals 3 or the like exert on the lowering hook 20, by way of the engagement element 101, a force which acts to rotate the lowering hook 20 in an anti-clockwise direction (FIG. 12). If the lowering hook is to be moved out of the locking position shown in FIG. 12, it is necessary to move the pivot pin 24 across the raised intermediate portion 26b of the reception slot 25, this only being possible if the engagement element 101 is also lowered slightly at the same time (FIG. 11). This means however, that the forces acting during normal operation on the lowering hook 20 located in the locking position oppose its displacement out of the locking position, that is, the lowering hook is automatically held in the locking position and can be released only by exerting a force which opposes the acting forces and which moves the pivot pin 24 across the intermediate portion 26b of the reception slot 25. To release the vehicle cover 1 a releasing force is applied with the aid of the actuating rods 10 and 11 which is moved to the right by the working cylinder 4 in the manner indicated in FIG. 4, whereby the pivot pin 24 is moved out of the position shown in FIG. 12 and across the position shown in FIG. 11, and thus the lowering hook is finally displaced into the position shown in FIG. 6.

In the embodiment shown in FIGS. 13 to 18, while retaining the previously described basic construction, a modification has been made in the form of a reception slot provided in the locking part and a guide slot provided in the lowering hook. Otherwise, parts in FIGS. 13 to 18 which are functionally identical to parts in FIGS. 1 to 12 are designated in each case by a reference numeral increased by 200.

As will be seen the reception slot 225, which is of linear configuration, is provided in the portion 215 of the locking part and also receives the pivot pin 224. The guide slot 222 in the lowering hook 220 is non-linear, e.g. forms a curve. The guide slot 222 whose boundary walls extending in the longitudinal direction of the slot are substantially equidistant from one another in order to guide the guide pin 223 in a sliding manner, has on its side directed outwardly towards the engagement element 301 (FIG. 13), a substantially linear portion 226c which is engaged by the guide pin 223 when the lowering hook 220 is in its upwardly directed engagement position. At the end of this linear portion 226c there is an intermediate portion 226b from which the side wall merges into an end portion 226a. Intermediate portion 226b is an angled portion, so that end portion 226a slopes downwardly relative to the slope of portion 226c.

Figure 14:
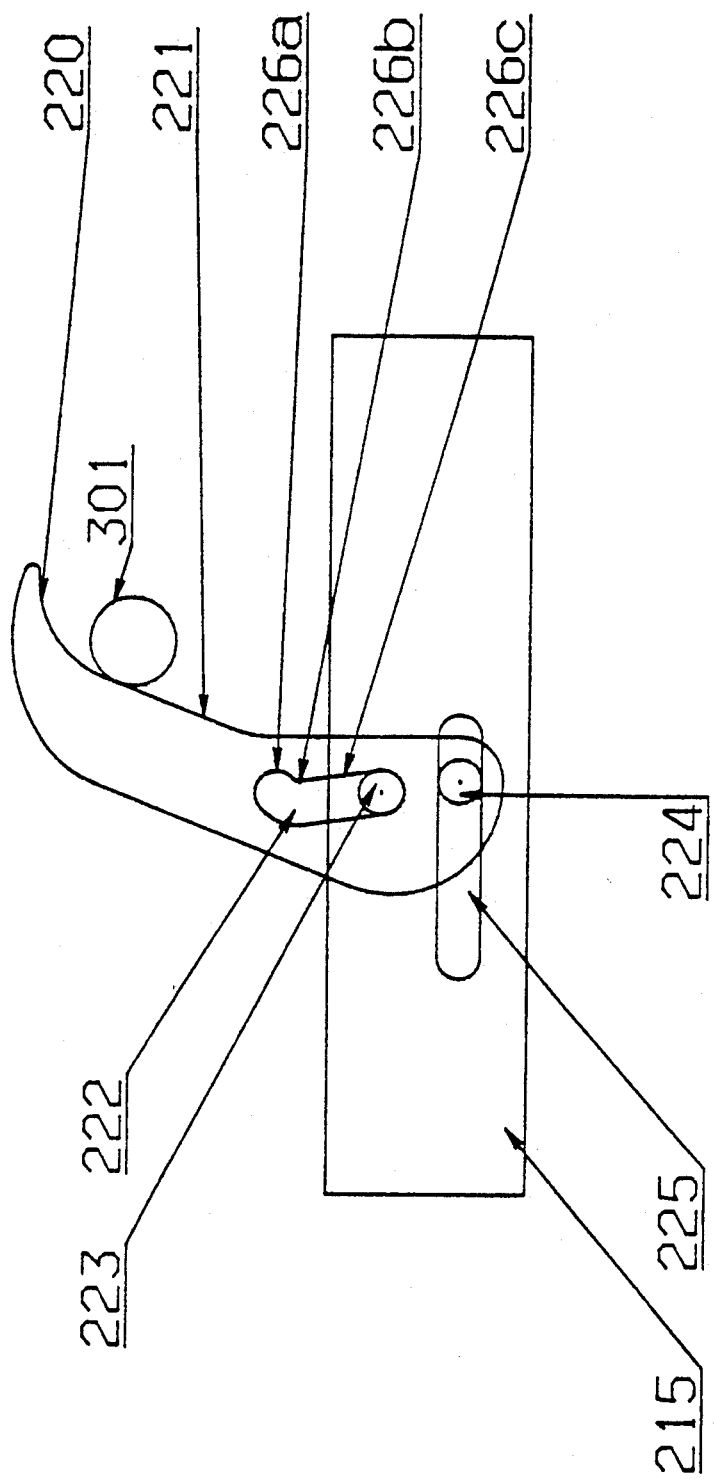
Figure 15:
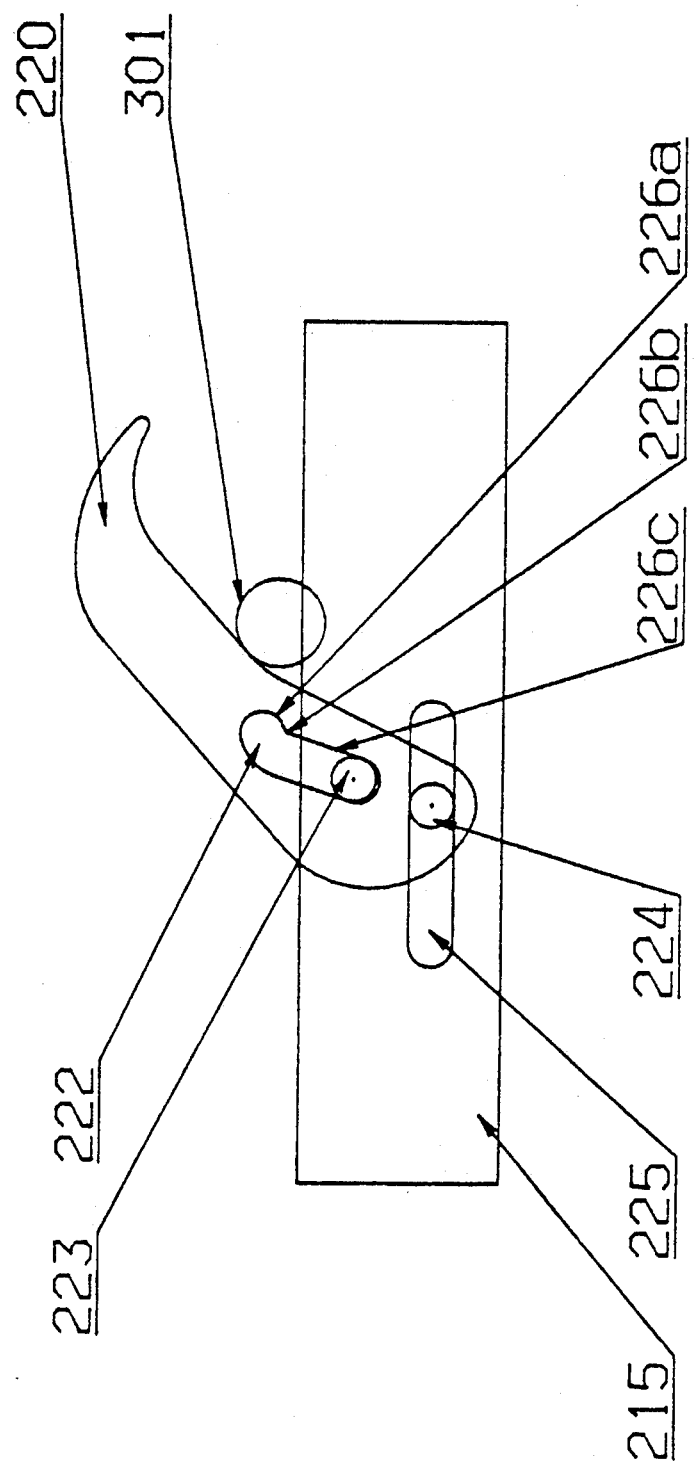
Figure 16:
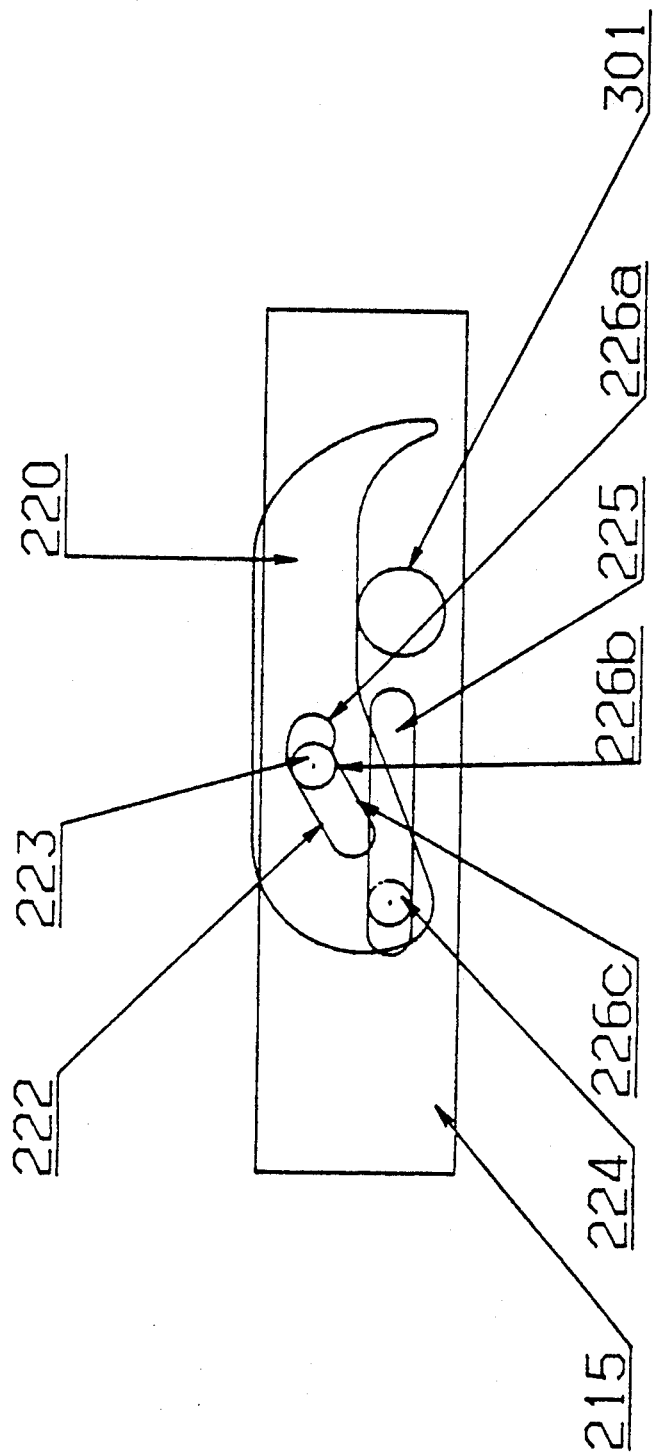
Figure 17:
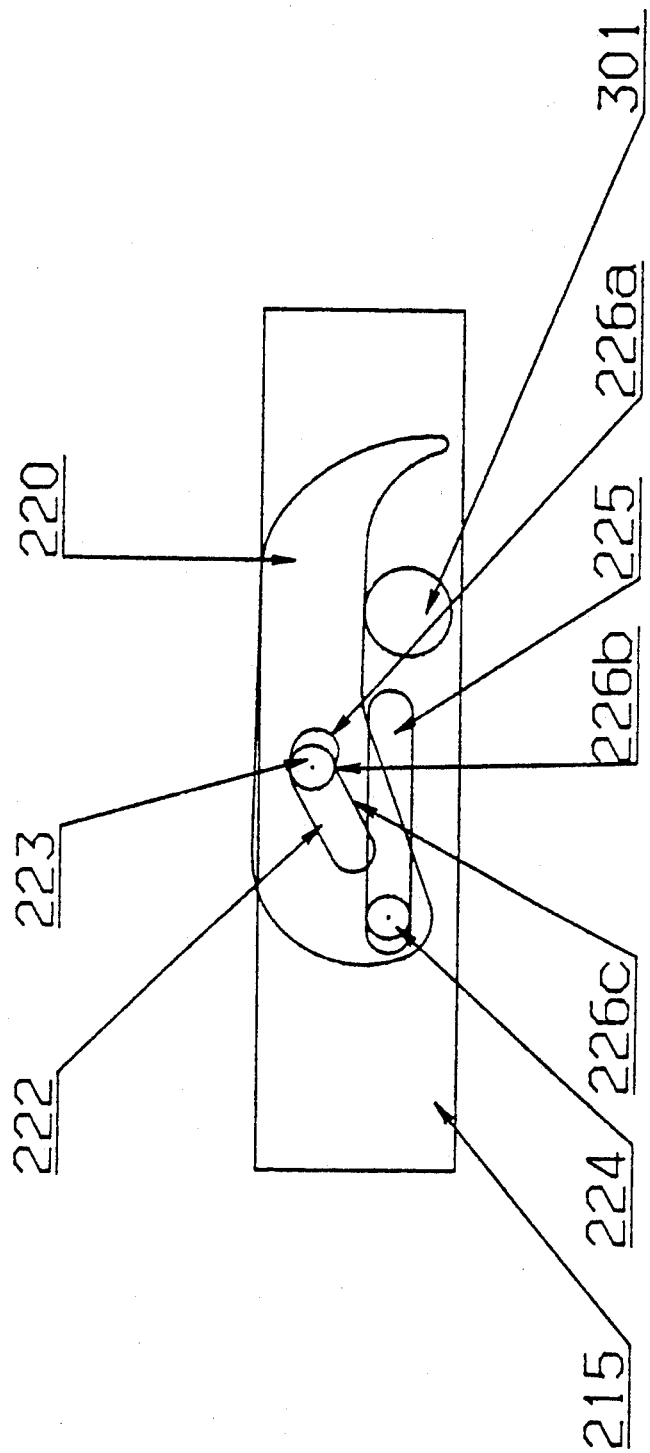

When the pivot pin 224 is moved to the left in the reception slot 225 by displacement of the actuating rod (not shown in FIGS. 13 to 18), a pivoting movement is imparted to the lowering hook 220 and brings the actuating contour 221 of the lowering hook 220 into engagement with the engagement element 301 of the vehicle cover and gradually lowers the engagement element 301 (FIGS. 14 to 16). At the same time, the guide pin 223 is displaced along the portion 226c of the guide slot 222 more and more towards the intermediate portion 226b. When the guide pin 223 has reached the intermediate portion 226b, the lowering hook 220 has been pivoted into the lowest position, and thus the engagement element 301 is also located in the lowest position which occurs during the lowering operation and which corresponds to the position shown in FIG. 11 in the above embodiment.

Upon further movement of the pivot pin 224 to the left in the reception slot 225, from the FIG. 16 position, the guide pin 223 moves across the intermediate portion 226b (FIG. 17) into the region of the end portion 226a of the guide slot 222. Since the end portion 226a is located lower than the intermediate portion 226b, the lowering hook 220 may thus be swung back approximately in an anti-clockwise direction until it reaches the locking position shown in FIG. 18.

Figure 18:
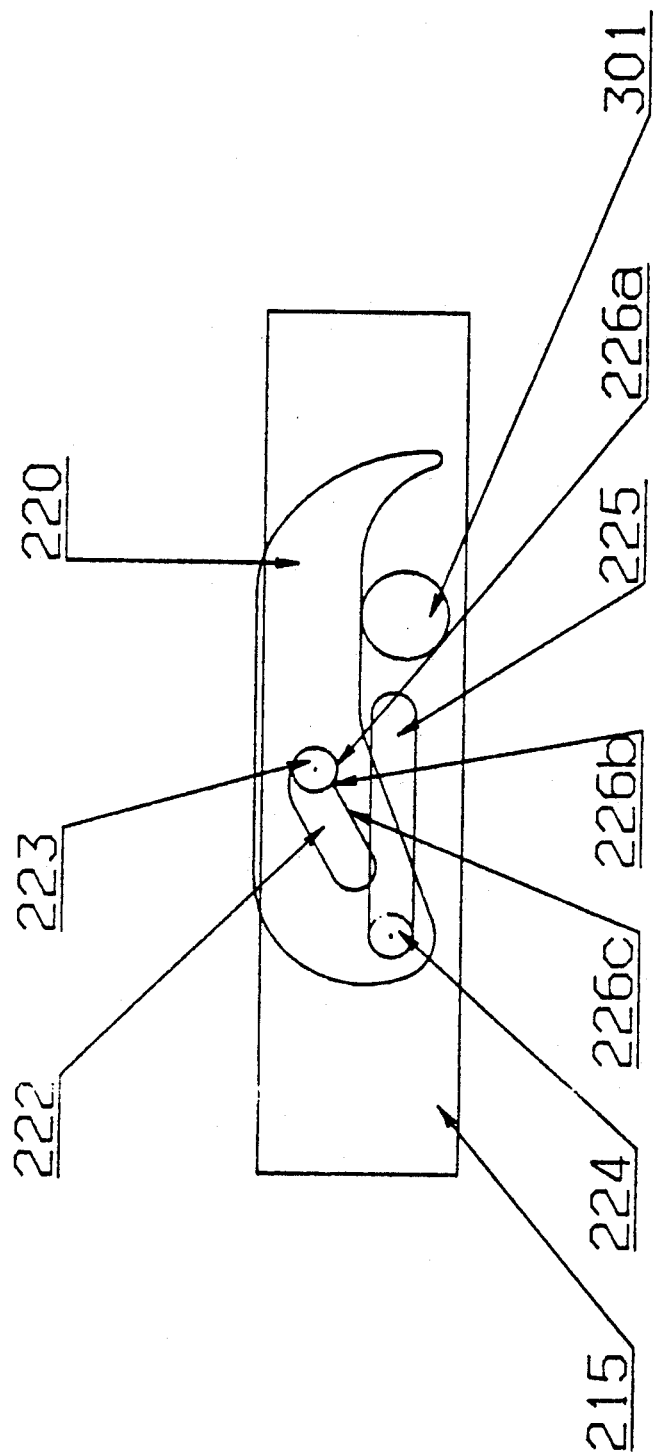

Corresponding to the embodiment shown in FIGS. 1 to 12, the lowering hook 220 is automatically held in the locking position shown in FIG. 18, since, to move it out of the locking position, the guide pin 223 must be moved across the raised intermediate portion 226b of the guide slot 222, which would require a force which opposes those forces acting on the lowering hook 220 in the locking position. Thus the vehicle cover (e.g. sunroof, hood, trunk, etc.) will not release under the forces encountered during normal operation of a vehicle.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A vehicle assembly comprising:

a vehicle frame defining an opening and an interior volume;

a vehicle cover for covering said vehicle frame opening;

locking means for securing said vehicle cover to said vehicle frame in a position wherein said vehicle cover covers said opening;

said locking means comprising at least one engagement element connected to said vehicle cover, and a locking assembly connected to said vehicle frame, said at least one locking assembly for cooperating with said at least one engagement element;

said locking assembly comprising: a hook having a contoured surface for sliding engagement with said engagement element; means defining a guide slot in said hook; a guide pin disposed in said guide slot; a pivot pin connected to said hook; and means defining a reception slot in said frame for receipt of said pivot pin; and said hook, guide slot, guide pin, pivot pin, and reception slot being positioned with respect to said engagement element and each other so that as said hook moves between a first position in which it does not engage said engagement element and said cover is not locked to said frame, and a second position in which said hook securely engages said engagement element and locks said cover to said frame, the first and second positions spaced a first distance apart, said hook passes through an intermediate position in which said engagement element has been moved toward the interior volume defined by said vehicle frame beyond said second position, so that said hook is automatically retained in said second position once moved to that position.

2. An assembly as recited in claim 1 further comprising resilient means between said vehicle frame and said vehicle cover for allowing movement of said hook to said intermediate position, and providing a biasing force holding said hook in said second position.

3. An assembly as recited in claim 2 wherein said resilient means comprises a resilient compressible material disposed between said vehicle frame and said vehicle cover.

4. An assembly as recited in claim 3 wherein said resilient compressible material is disposed on a peripheral portion of said vehicle cover and provides sealing engagement with said vehicle frame when said hook is in said second position.

5. An assembly as recited in claim 4 wherein said vehicle cover comprises a sunroof.

6. An assembly as recited in claim 1 wherein said vehicle cover comprises a sunroof.

7. An assembly as recited in claim 1 wherein said reception slot has a curved configuration with first and second ends, said first and second ends being spaced from each other and engaged by said pivot pin in said first and second positions of said hook, respectively, and said reception slot having an intermediate portion adjacent said second end which is spaced further from said first end than said second end.

8. An assembly as recited in claim 7 wherein said reception slot is generally horizontal, said first and second ends being vertically spaced.

9. An assembly as recited in claim 7 wherein said guide slot is linear.

10. An assembly as recited in claim 9 wherein said guide slot and reception slot each have a substantially constant width over their entire length.

11. An assembly as recited in claim 1 wherein said reception slot is linear and wherein said guide slot is non-linear.

12. An assembly as recited in claim 11 wherein said guide slot and said reception slot each have a substantially constant width over their length.

13. An assembly as recited in claim 11 wherein said reception slot extends substantially horizontally and said guide pin and pivot pin are always vertically displaced from each other.

14. An assembly as recited in claim 1 further comprising an actuating rod pivotally connected to said pivot pin, movement of said actuating rod effecting driving of said hook between said first and second positions.

15. Locking apparatus comprising:
first and second elements to be locked together;
locking means for selectively securing said first element to said second element;
said locking means comprising at least one engagement element connected to said first element, and at least one locking assembly connected to said second element, said at least one locking assembly for cooperating with said at least one engagement element;
each said locking assembly comprising: a hook having a contoured surface for sliding engagement with a said engagement element; means defining a guide slot in said hook; a guide pin disposed in said guide slot; a pivot pin connected to said hook; and means defining a reception slot in said second element for receipt of said pivot pin;
said hook, guide slot, guide pin, pivot pin, and reception slot being positioned with respect to said engagement element and each other so that as said hook moves between a first position in which it does not engage said engagement element and said second element is not locked to said first element, and a second position in which said hook securely engages said engagement element and locks said first element to said second element, said hook passing, between said first and second positions, through an intermediate, over-center, position so that said hook is automatically retained in said second position once moved thereto; and
resilient compressible seal means between said first element and said second element for allowing movement of said hook to said intermediate position, and providing a biasing force holding said hook in said second position once moved through said intermediate position.

16. Apparatus as recited in claim 15 wherein said reception slot has a curved configuration with first and second ends, said first and second ends being spaced from each other and engaged by said pivot pin in said first and second positions, respectively, and said reception slot having an intermediate portion adjacent said second end which is spaced further from said first end than said second end.

17. Apparatus as recited in claim 15 wherein said reception slot is linear and wherein said guide slot is non-linear.

18. Locking apparatus comprising:
first and second elements to be locked together;
locking means for selectively securing said first element to said second element;
said locking means comprising at least one engagement element connected to said first element, and at least one locking assembly connected to said second element, said at least one locking assembly for cooperating with said at least one engagement element;
each said locking assembly comprising: a hook having a contoured surface for sliding engagement with a said engagement element; means defining a non-linear guide slot in said hook; a guide pin disposed in said non-linear guide slot; a pivot pin connected to said hook; and means defining a linear reception slot in said second element for receipt of said pivot pin; and
said hook guide slot, guide pin, pivot pin, and linear reception slot being positioned with respect to said engagement element and each other so that as said hook moves between a first position in which it does not engage said engagement element and said second element is not locked to said first element, and a second position in which said hook securely engages said engagement element and locks said first element to said second element, said hook passing through an intermediate, over-center, position so that said hook is automatically retained in said second position once moved thereto.

19. Apparatus as recited in claim 18 further comprising resilient means between said first element and said second element for allowing movement of said hook to said intermediate position, and providing a biasing force holding said hook in said second position.

* * * * *